May 10, 1932.  S. DINARO  1,857,239
ELASTIC WHEEL
Filed July 30, 1928
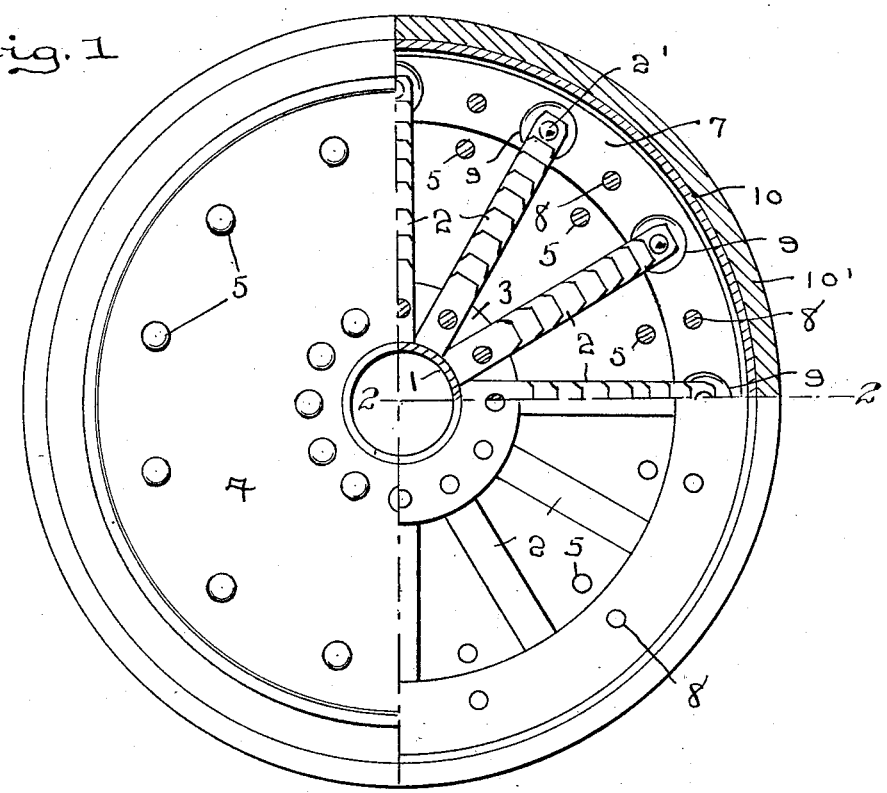
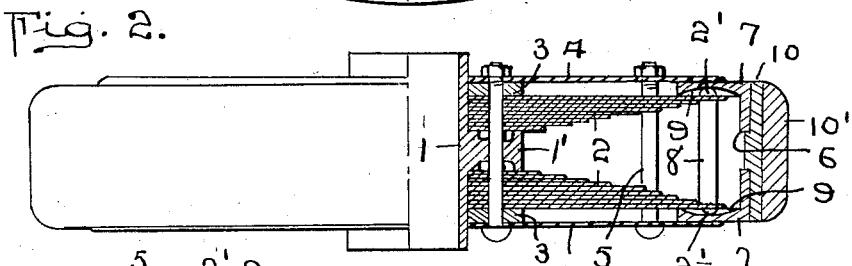
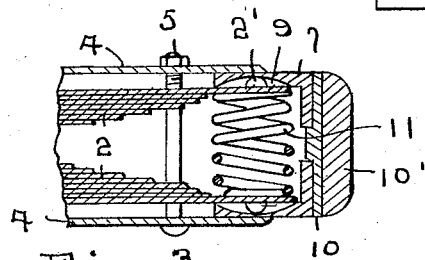
INVENTOR.
S. Dinaro
BY Marks+Clerk
ATTORNEYS.

Patented May 10, 1932

1,857,239

UNITED STATES PATENT OFFICE

SALVATORE DINARO, OF GENOA, ITALY

ELASTIC WHEEL

Application filed July 30, 1928, Serial No. 296,366, and in Italy July 30, 1927.

This invention relates to an elastic vehicle wheel of the type having spring spokes.

The wheel according to the invention is distinguished from other constructions of the aforesaid type in that each spoke is formed of laminated springs the inner ends of which are operatively connected to the hub and the outer ends of which are provided with means engaging depressions in members fixed to the wheel rim.

The stress applied to the springs when being mounted is such as to bring about a balance, so that, when the static load is applied to the wheel, the rim remains centralized with respect to the hub, with overload and with dynamic stress applied to the wheel the springs yield, permitting elastic decentralization of the rim in relation to the axis, which is possible owing to the fact that a projection or button provided at the extremity of each main leaf of each spoke moves over the surface of the relative depression, thus transforming the stresses due to overload or to shock into as many reactions in the axial direction of the wheel as there are spokes, the said reactions being equal and opposite.

Guide discs fixed to the hub serve to guide the rim in its movements.

In the accompanying drawings wherein an approved embodiment of the invention is illustrated:

Fig. 1 is a side view of the improved vehicle wheel, the left half thereof being a view of the exterior of the complete wheel, the lower right hand portion thereof showing the guide disc removed and the upper right hand portion showing the tire and rim in section.

Fig. 2 is a part section and part elevation, the sectional portion being indicated on line 2—2 of Fig. 1.

Fig. 3 is a fragmentary detail similar to the right hand portion of Fig. 2 showing a modification of the invention.

The principal parts of the wheel are:— a steel hub 1 with central flange 1'; a system of quarter-elliptical laminated springs 2 each of the main leaves of which is provided with a button 2' at its outer extremity; washers 3 formed with bolt holes; two guide discs 4 disposed normal to the hub and connected by bolts 5; a rim 6 with lateral flanges 7 connected by bolts 8 and provided with conical depressions 9; and a steel tire 10 with tread 10' adapted to deaden shocks and noise.

The springs 2 are constructed in such manner that, when the wheel is free of load, the buttons 2' are urged laterally outwards, the initial deflection of the springs being reduced to zero by tightening the bolts 8 connecting the two flanges 7.

The reaction developed by the springs and the form of the conical depressions 9 are so constructed and arranged that in normal position the springs balance the normal static load applied to the axle.

In order that the springs may offer the maximum resistance to buckling, the leaves when mounted are straight and normal to the axis of the wheel. Under overload or under dynamic stress applied to the body or to the rim there will be a tendency for the hub to be decentralized so that the flanges 7 will slide between the discs 4; for which reason it is necessary that the buttons 2' should each move along a generatrix of the surface of the relative depression 9 and consequently that the springs should be deflected further. The stresses are thus transformed into reactions parallel to the axis of the wheel, each being opposed by an equal reaction and therefore balancing one another.

When under shock the hub is decentralized in relation to the rim, the springs will tend to restore the hub to central position the buttons each returning to a position coaxial with the surface of the relative conical depression. As shown, the spokes on one side of the wheel are opposite to spokes on the other side of the wheel. On account of the regular and symmetrical disposition of the spokes and the form of the depressions, it results that all the spokes will be equally and simultaneously loaded and all will react equally, sustaining their part of the load.

11 denotes helical springs interposed between the ends of the main leaves of a pair of laminated springs.

Having now particularly described my invention what I claim is:—

In a wheel, laminated spring spokes, each including a main plate, a button member at the outer extremity of each main plate, a hub element connected with the inner extremities of the spokes, said spokes diverging outwardly from said hub element, a tire device provided with removable flanges having conical niches engaged by the button members, means connecting said flanges and acting to tension the springs spokes, and guide plates carried by the hub element and extending outwardly over the tire device.

In testimony whereof I affix my signature.

SALVATORE DINARO.